Nov. 24, 1931.  S. H. WOODARD  1,833,146
POWER PLANT
Filed Sept. 2, 1930  2 Sheets-Sheet 1

INVENTOR
Silas H. Woodard
BY
Johnston & Jennings
ATTORNEYS

WITNESS—
Charles H. Bassett

Nov. 24, 1931.    S. H. WOODARD    1,833,146
POWER PLANT
Filed Sept. 2, 1930    2 Sheets-Sheet 2

INVENTOR
Silas H. Woodard
BY Johnston & Jennings
ATTORNEYS

WITNESS
Charles H. Bassett

Patented Nov. 24, 1931

1,833,146

UNITED STATES PATENT OFFICE

SILAS H. WOODARD, OF NEW YORK, N. Y.

POWER PLANT

Application filed September 2, 1930. Serial No. 479,225.

My invention relates to power plants, more particularly to hydro power plants which must operate at widely varying effective heads, due to seasonal water supplies and consequent variation in depth of tail water, which in many cases is subject to considerable rise during flood flows, and has for its object the provision of apparatus of the character designated which shall be effective to deliver a substantially constant power output at such varying heads, making use of the excess of water available during times of reduced head.

A further object of my invention is to provide a hydro power plant in which there is a varying effective head, which shall include two or more turbines, together with means for effecting operation of the turbines under substantially constant speed, constant head conditions.

A still further object of my invention is to provide a hydro-electric power plant operating under condition of variable, seasonal, effective head and including constant speed power units, which shall be effective to deliver a substantially constant power output at all seasons.

It is well known in the art to which my invention relates, the speed of a hydraulic turbine varies as $$\sqrt{2gH}$$

for best efficiency and power output; $g$ representing the acceleration due to gravity, and $H$ the head under which the turbine is operating. For constant speed and variable head, the power output varies substantially as $H^{3/2}$. Inasmuch as present day operation of interconnected hydro-electric power plants necessitates constant speed turbines, it can readily be seen that a turbine designed for a given power output at an average head and a corresponding speed would deliver little or no power where the head is materially reduced, due to high tail water or otherwise. It will furthermore be seen that if a turbine is to operate at best efficiency and power output, the ideal condition of operation is with a constant head.

In accordance with my invention I provide two or more turbines which, for economy of construction are preferably connected to the same shaft, and arrange these turbines at different levels with respect to the head water. Where two turbines are employed, each is preferably designed to operate at its maximum efficiency at half the effective head in seasons of low tail water and are disposed at levels so that, when run in series with respect to water flow, each operates at substantially half the effective head.

During seasons of high tail water when the effective head is, say, one half that during low tail water, the turbines are run in parallel with respect to water flow and both operate at the total effective head. During seasons when the effective head is between the extreme limits mentioned, the turbines may be operated either in series or in parallel, regulating the flow of water by the means hereinafter disclosed, whereby there is maintained a substantially constant power output during all seasons.

In order to bring about the above outlined operation of my improved power plant I provide a draft tube for the upper turbine leading to the intake of the lower turbine. Above the lower turbine, I interpose a baffle wall and opposite the baffle wall I provide a tail gate for the upper turbine. Valves are disposed in the passages defined by the baffle wall whereby water discharged from the upper turbine may be diverted directly to the tail water, or the upper tail gate may be closed and the valves opened to pass the water through the lower turbine. A separate head gate and a tail gate is provided for the lower turbine whereby it may be supplied directly from the head water whenever it is desired to operate the turbines in parallel. The tail gates, in operation, may be employed as throttle valves and both turbines are arranged to discharge through a water seal.

A power plant embodying features of my invention is illustrated in the accompanying drawings forming a part of this application, in which Fig. 1 is a cross sectional view of my improved power plant;

Figure 1:
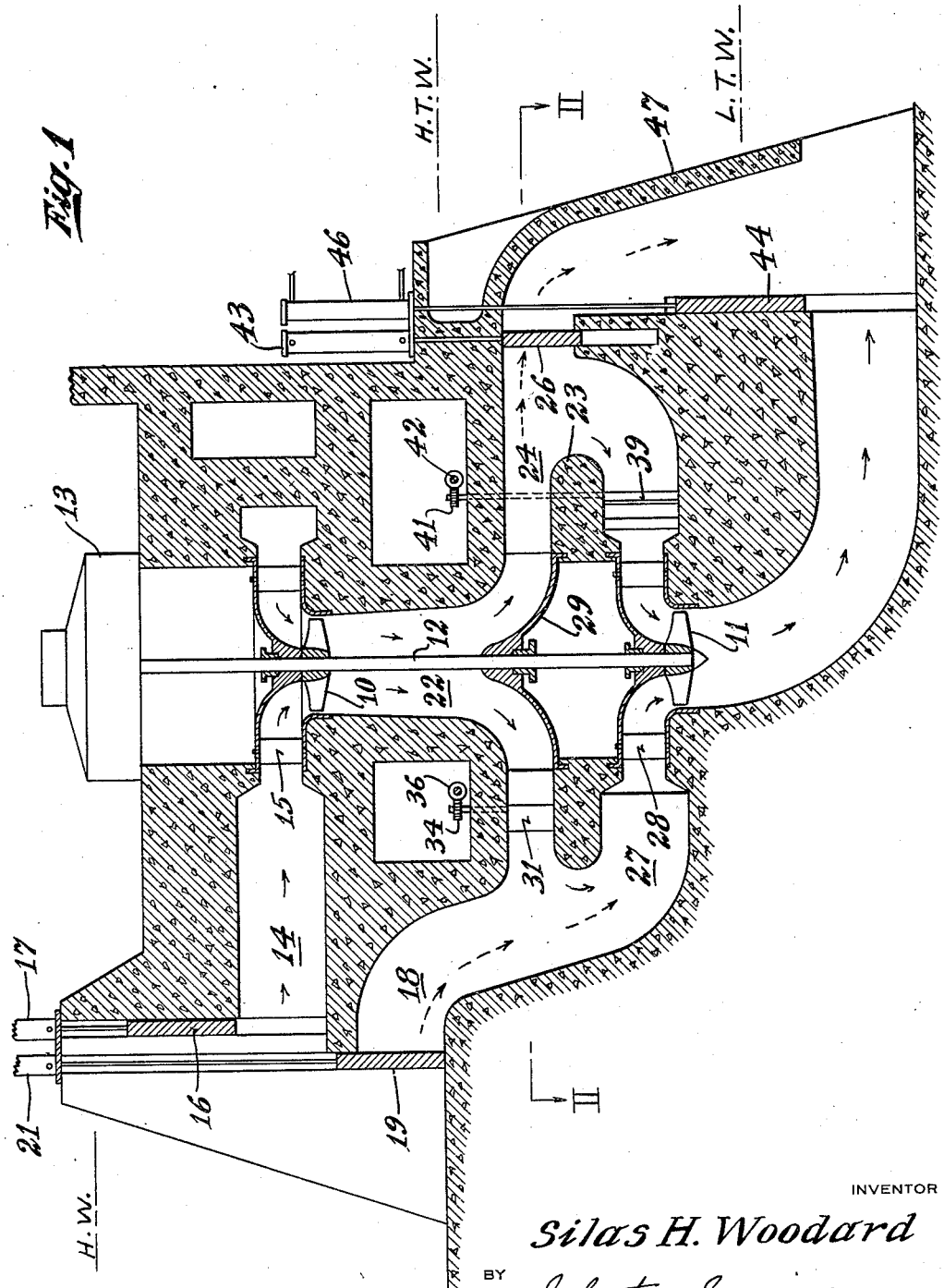

Referring to the drawings for better understanding of my invention, I show an upper hydraulic turbine 10 and a lower hydraulic turbine 11 connected to a common shaft 12 and driving an electric generator 13. Water for driving the upper turbine 10 is supplied through a conduit 14 and conventional wicket gates 15 from a head gate 16, communicating with the head water, the head gate 16 being operated by any suitable means such as a hydraulic cylinder 17.

A lower conduit 18 may supply water to the lower turbine 11 from the head water, the supply of water through this conduit being controlled by a head gate 19, communicating with the head water, which may be operated by a hydraulic cylinder 21.

The upper turbine 10 discharges downwardly through a draft tube 22 toward the lower turbine 11. Interposed in the draft tube 22 is a baffle wall 23 extending across the draft tube 22 as may be seen in Fig. 2. The baffle wall 23 defines an upper passage 24 leading to a tail gate 26 for the upper turbine and a lower passage 27 in which is located the lower turbine 11, water flowing thereto through suitable wicket gates 28. A conical casting 29 mounted centrally of the baffle wall 23 provides a crown for diverting the water from the turbine 10 around the baffle wall 23. It will be noted also that the ends of the baffle wall are curved to provide a smooth flow for the water as it passes therearound.

Figure 2:
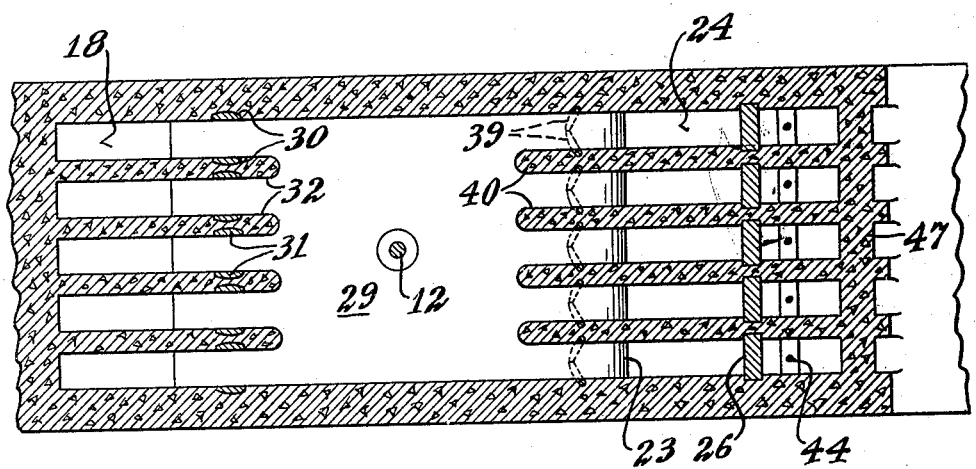
Fig. 2 is a sectional view taken along the line II—II of Fig. 1.
Figure 3:
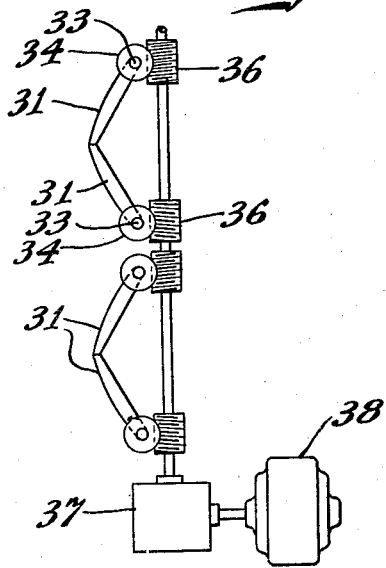
Fig. 3 is a fragmentary plan view of a mechanism which may be employed in operating the valves, removed from the turbine setting.

Disposed in recesses 30 provided in partition walls 32 in the passage 24 are a plurality of valves 31, as may best be seen in Fig. 2. While numerous mechanisms for operating the valves 31 will suggest themselves to those skilled in the art, the following is a typical means which may be employed. Each of the valves 31 is mounted on a vertical shaft 33 provided with a worm gear 34. The worm gears 34 for each pair of valves are provided with oppositely pitched teeth which mesh with worms 36 driven through a suitable reduction gearing 37 by means of a motor 38. A set of similar valves 39 are provided in partition walls 40 in the lower passage 27 and are operated through similar worm gears 41 from a shaft 42.

Whenever it is desired to discharge the water passing through the upper turbine 10 directly to the tail water, the valves 31 and 39 are closed and the tail gate 26 opened, the tail gate 26 being operated by means of a hydraulic cylinder 43. The lower turbine 11 is provided with a separate tail gate 44 operated by means of a hydraulic cylinder 46.

In order that all discharge shall be under a seal, I provide a sealing wall 47 extending outwardly and downwardly in front of the tail gate 26.

From the foregoing description, the operation of apparatus made in accordance with my invention will be readily understood. Whenever it is desired to operate the turbines 10 and 11 in series, the head gate 16 is opened while the head gate 19 is closed. The tail gate 26 is closed and the tail gate 44 is opened. Also the valves 31 and 39 are opened. The turbines are operated in the manner just described during seasons of low tail water and relatively high head. The water passing through the upper turbine 10 passes through the valves 31 and around the baffle wall 23, through the valves 39 and through the turbine 11 to be discharged through the tail gate 44.

During seasons of high tail water, when the effective head is low, the head gates 16 and 19 are both opened and the valves 31 and 39 are closed. The tail gates 26 and 44 are both opened so that water passes through the conduits 14 and 18, through the turbines 10 and 11 in parallel, being discharged through the tail gates 26 and 44. Any throttling necessary may be accomplished by means of the tail gates 26 and 44.

It will be seen that my invention provides a means whereby the power output of a plant constructed in accordance therewith may be maintained substantially constant in localities subject to varying seasonal water flow, and wherein the effective head varies inversely with the water flow. It also provides a means whereby inherently low head turbines, such for example as propeller-type turbines, may be employed in locations where the effective head varies between that at which such a turbine operates most efficiently, and a greater head.

My invention is also adapted to very high head installation, where the head is too great for the practical use of a single turbine. In such installations, a number of turbines may be arranged in accordance with my invention to operate in series in one power plant, rather than in a plurality of plants disposed at different levels.

The turbines of a power plant arranged in accordance with my invention operate at practically a constant relation of peripheral velocity of runners to the spouting velocity of the water and accordingly operate closely approximating ideal conditions. Furthermore my invention provides a means for greatly improving regulation of the power plant as a whole and greatly reduces pitting of the runners.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a power plant, a pair of turbines disposed at different levels with respect to the motive fluid head, and means for selectively passing motive fluid through said turbines in parallel and in series.

2. In a power plant, a turbine disposed at a relatively high level with respect to the motive fluid head, conduit means for conveying motive fluid to the said turbine, a draft tube for the turbine, a second turbine disposed at a relatively lower level than the first mentioned turbine, a tail gate for the upper turbine, a separate draft tube and tail gate for the lower turbine, separate head gates for the turbines, and valve means associated with the draft tube of the upper turbine for selectively passing the motive fluid discharged from the upper turbine through the lower turbine and through the upper tail gate.

3. In a power plant, a pair of turbines connected to a common shaft and disposed at different levels with respect to the head water, separate head gates and tail gates for the two turbines, a draft tube for the upper turbine extending downwardly toward the lower turbine, a baffle wall interposed in the draft tube and defining passages leading to the lower turbine and to the tail gate for the upper turbine, and valve means associated with the baffle wall for selectively controlling the flow of motive fluid through the turbines and through the tail gates.

4. In a power plant a pair of turbines connected to a common vertical shaft and disposed at different levels with respect to the head water, separate head gates for the two turbines, a draft tube for the upper turbine extending downwardly toward the lower turbine, a baffle wall interposed in the draft tube above the lower turbine, valve means for closing off the flow of motive fluid from the upper to the lower turbine, a tail gate for the upper turbine disposed substantially level with the baffle wall, and a separate tail gate for the lower turbine.

5. In a power plant a first and a second turbine, a draft tube leading from the first turbine to the second, separate head gates for the turbines, a tail gate for the first turbine communicating with the draft tube, a separate draft tube and tail gate for the second turbine, and valve means for diverting water from the first mentioned draft tube through the second turbine.

6. In a power plant, a first turbine, a second turbine, gate means for controlling the supply of head water to both turbines, other gate means for controlling the discharge of water from both turbines, and valve means for diverting the water passing from the first turbine through the second turbine.

In testimony whereof I affix my signature.

SILAS H. WOODARD.